US012641421B2

(12) United States Patent
Choi et al.

(10) Patent No.: US 12,641,421 B2
(45) Date of Patent: May 26, 2026

(54) METHOD AND APPARATUS FOR AUTHENTICATING AN ATTACK OF FALSE BASE STATION IN A WIRELESS COMMUNICATION SYSTEM

(71) Applicant: SAMSUNG ELECTRONICS CO., LTD., Suwon-si (KR)

(72) Inventors: Hongjin Choi, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 360 days.

(21) Appl. No.: 18/227,852

(22) Filed: Jul. 28, 2023

(65) Prior Publication Data

US 2024/0040379 A1      Feb. 1, 2024

(30) Foreign Application Priority Data

Jul. 28, 2022      (KR) ......................... 10-2022-0094140
Nov. 11, 2022      (KR) ......................... 10-2022-0150780

(51) Int. Cl.
*H04W 12/06*          (2021.01)
*H04W 60/00*          (2009.01)
(52) U.S. Cl.
CPC ........... *H04W 12/06* (2013.01); *H04W 60/00* (2013.01)
(58) Field of Classification Search
CPC ..... H04W 12/06; H04W 60/00; H04W 48/12; H04W 60/04; H04W 12/122; H04W 12/108
See application file for complete search history.

(56) References Cited

U.S. PATENT DOCUMENTS

| | | | |
|---|---|---|---|
| 2017/0295489 A1 | 10/2017 | Agiwal et al. | |
| 2019/0141524 A1* | 5/2019 | Wang .................... | H04W 12/02 |
| 2020/0120579 A1 | 4/2020 | Byun et al. | |
| 2020/0145821 A1 | 5/2020 | Lee et al. | |
| 2021/0111902 A1* | 4/2021 | Lee ...................... | H04W 12/069 |
| 2022/0167169 A1* | 5/2022 | Nakarmi ............... | H04W 76/20 |

(Continued)

OTHER PUBLICATIONS

International Search Report and Written Opinion of the International Searching Authority dated Nov. 10, 2023, in connection with International Application No. PCT/KR2023/010985, 8 pages.

(Continued)

*Primary Examiner* — Brandon J Miller

(57) ABSTRACT

The disclosure relates to a 5th generation (5G) or 6th generation (6G) communication system for supporting a higher data transmission rate. The disclosure provides a base station authentication method which includes receiving system information from a base station, determining whether the system information includes signature information, in case that the signature information is not included, storing information of whether the signature information is included, obtaining information regarding signing capability for the system information of the base station, and determining whether to continue an attach procedure with the base station, based on at least one of the information of whether the signature information is included and the signing capability for the system information of the base station.

12 Claims, 11 Drawing Sheets

(56) References Cited

U.S. PATENT DOCUMENTS

2022/0173911 A1    6/2022    Ohlsson et al.

OTHER PUBLICATIONS

Huawei et al., "Security capability negotiation during unicast establishment after restricted discovery", S3-220874, Revision of S3-22xxxx, 3GPP TSG-SA3 Meeting #107e, e-meeting, May 16-20, 2022, 1 page.

Samsung, "Solution for AS security during RRC Idle mode", S3-190943, 3GPP TSG-SA WG3 Meeting #94Ad-Hoc, Stockholm (Sweden), Mar. 11-15, 2019, 4 pages.

Supplementary European Search Report dated Jul. 7, 2025, in connection with European Patent Application No. EP23847031.4, 10 pages.

* cited by examiner

METHOD AND APPARATUS FOR AUTHENTICATING AN ATTACK OF FALSE BASE STATION IN A WIRELESS COMMUNICATION SYSTEM

CROSS-REFERENCE TO RELATED APPLICATIONS

This application is based on and claims priority under 35 U.S.C. § 119 to Korean Patent Application No. 10-2022-0094140, filed on Jul. 28, 2022, and Korean Patent Application No. 10-2022-0150780 filed on Nov. 11, 2022, in the Korean Intellectual Property Office, the disclosure of which are incorporated by reference herein in their entirety.

BACKGROUND

1. Field

The disclosure relates to a method and an apparatus for authenticating a base station in a wireless communication system. Specifically, the disclosure relates to the method and the apparatus of a user equipment (UE) for authenticating the base station by combining system information broadcast by the base station and information received after mutual authentication with the base station in the wireless communication system.

2. Description of Related Art

5th generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Band-Width Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Based on the above discussion, the disclosure is to provide a method and an apparatus for efficiently authenticating a base station in a wireless communication system.

According to an embodiment of the disclosure, a method performed by a terminal in a wireless communication system may include receiving system information from a base station, determining whether the system information includes signature information, in case that the signature information is not included, storing information of whether the signature information is included, obtaining information regarding signing capability for the system information of the base station, and determining whether to continue an attach procedure with the base station, based on at least one of the information of whether the signature information is included and the signing capability for the system information of the base station.

The system information may further include information regarding a public key of the base station, the method may include, in case that the system information includes the signature information, determining whether the information regarding the public key of the base station is stored in the terminal, in case that the public key corresponding to the information regarding the public key of the base station is stored, verifying a signature of the base station, and storing information of whether the signature is verified, wherein the determining of whether to continue an attach procedure with the base station comprises determining whether to continue the attach procedure with the base station by further considering the information of whether the signature is verified. The Attach Procedure The method may include, in case that the public key corresponding to the information regarding the public key of the base station is not stored, storing the system information and the signature information.

Obtaining of the signing capability for the system information may comprise obtaining the signing capability for the system information from at least one of the base station and an access management function (AMF).

Obtaining of the signing capability for the system information may comprise obtaining the signing capability for the system information through at least one of a non-access stratum (NAS) message and an AS message.

Determining of whether to continue the attach procedure with the base station may further comprise in case that the system information does not include the signature information and the base station supports the signing capability for the system information, searching for another base station the attach procedure.

Determining of whether to continue the attach procedure with the base station may further comprise in case that the system information and the signing information are stored and the base station does not support the signing capability for the system information, searching for another base station the attach procedure.

Determining of whether to continue the attach procedure with the base station may comprise in case that the signature is verified and the base station does not support the signing capability for the system information, searching for another base station.

According to an embodiment of the disclosure, a method performed by a base station in a wireless communication system may include broadcasting system information to a terminal, transmitting a message comprising information regarding signing capability for the system information to the terminal, and continuing an attach procedure with the terminal based on a base station authentication result by the terminal.

The system information may include at least one of signature information or information regarding a public key of the base station.

According to an embodiment of the disclosure, a terminal in a wireless communication system may include a transceiver and at least one processor coupled with the transceiver, and the at least one processor may be configured to receive system information from a base station, determine whether the system information includes signature information, in case that the signature information is not included, store information of whether the signature information is included, obtain information regarding signing capability for the system information of the base station, and determine whether to continue an attach procedure with the base station, based on at least one of the information of whether the signature information is included and the signing capability for the system information of the base station.

The system information may include information regarding a public key of the base station, and the at least one processor may be configured to, in case that the system information includes the signature information, determine whether the information regarding the public key of the base station is stored in the terminal, in case that the public key corresponding to the information regarding the public key of the base station is stored, verify a signature of the base station, and store information of whether the signature is verified, determine whether to continue the attach procedure with the base station by further considering the information of whether the signature is verified the attach procedure.

The at least one processor may be configured to, in case that the public key corresponding to the information regarding the public key of the base station is not stored, store the system information and the signature information.

The at least one processor may be configured to obtain the signing capability for the system information from at least one of the base station and an access management function (AMF).

The at least one processor may be configured to obtain the signing capability for the system information through at least one of a non-access stratum (NAS) message and an AS message.

The at least one processor may be configured to search for another base station in case that the system information does not includes the signature information and the base station supports the signing capability for the system information.

The at least one processor may be configured to searching for another base station in case that the system information and the signing information are stored and the base station does not support the signing capability for the system information.

The at least one processor may be configured to search for another base station in case that the signature is verified and the base station does not support the signing capability for the system information.

According to an embodiment of the disclosure, a base station in a wireless communication system may include a transceiver and at least one processor, and the at least one processor may be configured to broadcast system information to a terminal, transmit a message comprising information regarding signing capability for the system information to the terminal, and continuing an attach procedure with the terminal based on a base station authentication result by the terminal.

The system information may include at least one of signature information or information regarding a public key of the base station.

Various embodiments of the disclosure may provide an apparatus and a method for efficiently providing a service in a wireless communication system.

Effects obtainable from the disclosure are not limited to the effects mentioned in various embodiments, and other effects which are not mentioned may be clearly understood by those skilled in the art of the disclosure through the following descriptions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
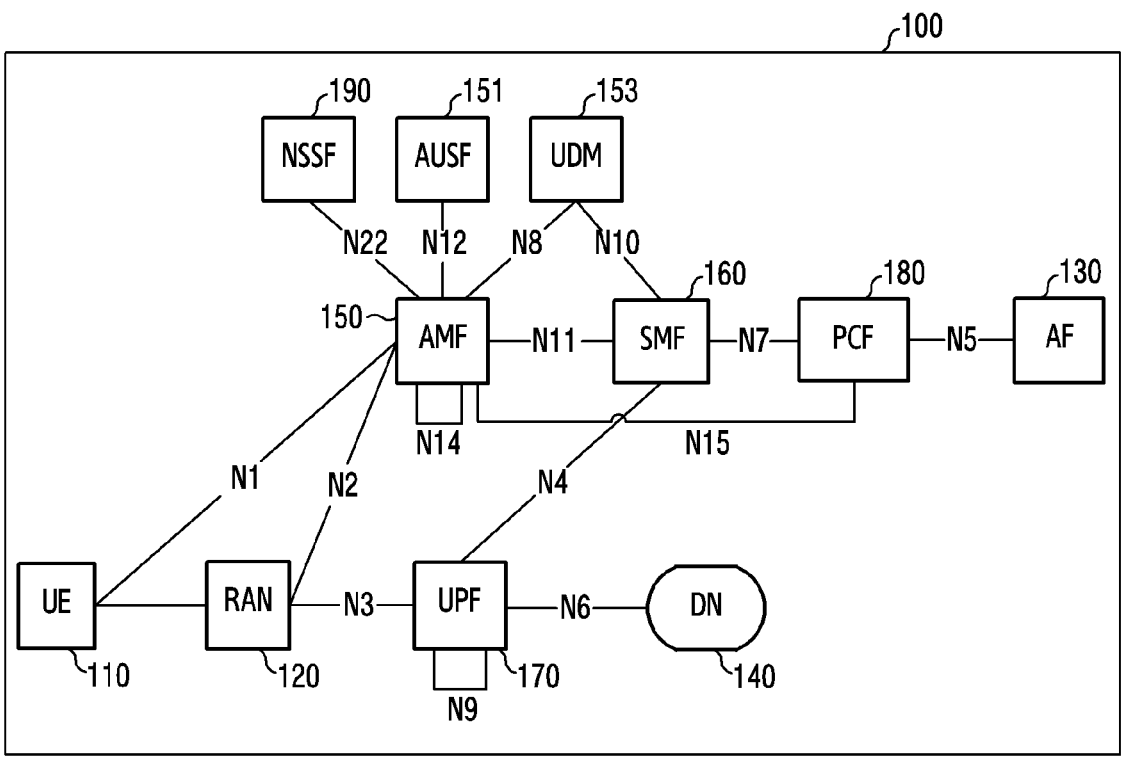
FIG. 1A illustrates a communication network including core network entities in a wireless communication system according to various embodiments of the disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the disclosure are used merely to describe specific embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the disclosure. Among the terms used in the disclosure, terms defined in a general dictionary may be interpreted as having the same or similar meanings as those in the context of the related art, and unless explicitly defined in the disclosure, may not be interpreted as ideal or excessively formal meanings. In some cases, even terms defined in the disclosure may not be interpreted to exclude embodiments of the disclosure.

A hardware-based approach will be described as an example in various embodiments of the disclosure to be described hereafter. However, various embodiments of the disclosure include technology which uses both hardware and software, and accordingly various embodiments of the disclosure do not exclude a software-based approach.

The 3rd generation partnership project (3GPP) in charge of a cellular mobile communication standard names a new core network architecture a 5th generation core (5GC) and is working on standardization for evolution from a conventional 4th generation (4G) long term evolution (LTE) system to a 5G system. The 5GC supports differentiated functions as follows from an evolved packet core (EPC) which is a network core for the conventional 4G.

First, the 5GC employs a network slice function. For 5G requirements, the 5GC needs to support various types of terminals and services (e.g., enhanced mobile broadband (eMBB), ultra reliable low latency communications (URLLC), or massive machine type communications (mMTC) service). The various services each have different requirements for the core network. For example, the eMBB service requires a high data rate, and the URLLC service requires high stability and low latency. Network slicing is one of techniques suggested to satisfy various services requirements.

Network slicing is a method of virtualizing one physical network to build multiple logical networks, and each network slice instance (NSI) may have different characteristics. Accordingly, each NSI may have a network function (NF) fitting characteristics thereof and thus satisfy various service requirements. Various 5G services may be efficiently supported, if an NSI fitting characteristics of a service required by each terminal is allocated.

Second, the 5GC may facilitate network virtualization paradigm support through separation of a mobility management function and a session management function. 4G LTE may provide a service through signaling exchange with single core equipment which is a mobility management entity (MME) in charge of registration, authentication, mobility management and session management functions of all terminals. However, as the number of terminals explosively increases and mobility and traffic/session characteristics to support according to a type of each terminal are subdivided in 5G, if the single equipment such as the MME supports all the functions, scalability for adding an entity for each function as needed may be deteriorated. Hence, various functions are developed based on a structure of separating the mobility management function and the session management function to improve the scalability in terms of function/implementation complexity and a signaling load of the core equipment in charge of a control plane.

Meanwhile, as an open source tool and a hacking technique for easily creating fake base stations and mobile communication terminals advance, an aggressor may easily impose a denial of service (DoS) attack on a user and a communication provider using the fake base station. Hence, a solution for preventing the DoS attack from the fake base station is demanded. For example, a system information (SI) message may be attacked in a message broadcast by a base station. The fake base station may modify and broadcast the SI message. If a terminal uses the SI message transmitted by the fake base station, the terminal may camp on the fake base station, rather than the base station to access. The fake base station may relay a message between the terminal and the genuine base station, obtain the message which is not encrypted, and drop the message which is encrypted, to deny a user's intended service.

The SI message is broadcast to every user equipment (UE), and protection for SI was not required, previously. However, the advance of the open source tool and the hacking technique facilitates the attack using the fake base station, the fake base station may attack the UE by allowing the UE to camp on the fake base station using the SI transmitted by the genuine base station, and it is desirable to protect the SI and to allow the UE to determine whether the genuine base station transmits the SI. It is desirable to adopt a security technology for protecting integrity and preventing retransmission, to block the fake base station from modifying and using the SI. For doing so, an asymmetric key based signature scheme is researched. However, unless every base station has capability for signing the SI, if the base station signs the SI with a private key but the fake base station transmits the message by deleting a signature related value, the UE receiving the message may not determine whether the corresponding base station does not transmit the signature due to no signing capability updating, or whether the fake base station relays the message by deleting the corresponding value. Hence, the UE receiving the SI should determine whether the corresponding SI is tampered with by the fake base station.

According to various embodiments of the disclosure, the UE receiving the SI may store the SI differently depending on whether the message contains the signature, whether the UE has a public key for verifying the corresponding signature, or whether the genuine base station transmits the SI with the signature, and efficiently detect the fake base station by distinguishing its operation. Whether the genuine base station transmits the SI with the signature provided by an access management function (AMF) or the base station to the UE using a non-access stratum (NAS) security mode command message or an access stratum (AS) security mode command message integrity-protected after mutual authentication between the UE and the network. If this information is different from the SI signature used by the UE to camp on, the UE may detect the attack of the fake base station and defend against the attack of the fake base station by searching for another cell out of the corresponding cell. Thus, not only a UE with the public key for the signature verification but also a UE without the public key for the signature verification may verify the SI signature in the corresponding cell.

According to various embodiments of the disclosure, the UE without the public key for the signature verification may authenticate the genuine base station, by storing the SI and verifying the stored SI signature using a public key received from the network in a registration process.

According to various embodiments of the disclosure, the network transmits the NAS security mode command message or the AS security mode command message which is integrity-protected, by indicating whether the corresponding base station signs, and the UE may compare the message with the received SI and thus determine whether the fake base station attacks.

According to various embodiments of the disclosure, depending on whether the SI message broadcast by the base station contains the signature, whether the UE has the public key for verifying the corresponding SI signature, and whether the base station actually signs the SI, the UE operation may efficiently detect the fake base station.

According to various embodiments of the disclosure, unlike the 'genuine base station' to be accessed by the UE, the 'fake base station' is not to be accessed by the UE, and may be referred to as similar or equivalent various expressions including an aggressor base station, a false base station or a fake base station. The 'genuine base station' uses the access of the UE, and may be referred to as similar or equivalent various expressions including a victim base station and a real base station. According to embodiments of the disclosure, operations to be described may indicate operations between the UE and the genuine base station, wherein the 'base station' may represent the 'genuine base station' to be accessed by the UE.

Hereinafter, various embodiments are described in detail with reference to the accompanying drawings. Also, in describing the embodiment of the disclosure, a detailed description of a related known function or configuration will be omitted if it is deemed to make the gist of the embodiment of the disclosure unnecessarily vague. Terms to be described hereafter have been defined by taking into consideration functions in the disclosure, and may differ depending on a user or an operator's intention or practice. Accordingly, they should be defined based on contents throughout the entire specification.

For the same reason, some components in the accompanying drawings are exaggerated, omitted, or schematically illustrated. Also, a size of each component does not entirely reflect an actual size. The same reference number is given to the same or corresponding element in each drawing.

Advantages and features of the disclosure, and methods for achieving them will be clarified with reference to embodiments described below in detail together with the accompanying drawings. However, the disclosure is not limited to the embodiments disclosed below but may be implemented in various different forms, the embodiments are provided to only complete the scope of the disclosure and to allow those skilled in the art to which the disclosure pertains to fully understand a category of the disclosure, and the disclosure is solely defined within the scope of the claims. The same reference numeral refers to the same element throughout the specification.

At this time, it will be understood that each block of the process flowchart illustrations and combinations of the flowchart illustrations may be executed by computer program instructions. Since these computer program instructions may be mounted on a processor of a general purpose computer, a special purpose computer or other programmable data processing apparatus, the instructions executed by the processor of the computer or other programmable data processing equipment may generate means for executing functions described in the flowchart block(s). Since these computer program instructions may also be stored in a computer-usable or computer-readable memory which may direct a computer or other programmable data processing equipment to function in a particular manner, the instructions stored in the computer-usable or computer-readable memory may produce a manufacture article including instruction means which implement the function described in the flowchart block(s). Since the computer program instructions may also be loaded on a computer or other programmable data processing equipment, a series of operational steps may be performed on the computer or other programmable data processing equipment to produce a computer-executed process, and thus the instructions performing the computer or other programmable data processing equipment may provide steps for executing the functions described in the flowchart block(s).

In addition, each block may represent a portion of a module, a segment or code which includes one or more executable instructions for implementing a specified logical function(s). Also, it should be noted that the functions mentioned in the blocks may occur out of order in some alternative implementations. For example, two blocks shown in succession may in fact be executed substantially concurrently or the blocks may sometimes be executed in the reverse order depending on corresponding functionality.

At this time, the term 'unit' as used in the present embodiment indicates software or a hardware component such as a field programmable gate array (FPGA) or an application-specific integrated circuit (ASIC), and 'unit' performs specific roles. However, 'unit' is not limited to software or hardware. 'unit' may be configured to reside on an addressable storage medium and configured to reproduce on one or more processors. Accordingly, 'unit' may include, for example, components such as software components, object-oriented software components, class components and task components, processes, functions, attributes, procedures, sub-routines, segments of program code, drivers, firmware, microcode, circuitry, data, databases, data structures, tables, arrays, and variables. The functionalities provided in the components and 'unit' may be combined to fewer components and '-units' or may be further separated into additional components and '-units'. Further, the components and '-units' may be implemented to reproduce one or more central processing units (CPUs) within a device or a security multimedia card. Also, 'unit' in the embodiment may include one or more processors.

Hereafter, the base station is an entity for performing resource allocation of the terminal, and may be at least one of an eNode B (eNB), a NodeB, a base station (BS), a radio access network (RAN), an access network (AN) a RAN node, a new radio (NR) NB, a next generation node B (gNB), a radio access unit, a base station controller, or a node on the network. The terminal may include a UE, a mobile station (MS), a cellular phone, a smartphone, a computer, or a multimedia system for executing a communication function. The terminal is the UE as an example in various embodiments of the disclosure. In addition, various embodiments of the disclosure are explained with LTE, LTE-advanced (A), or NR as an example, but the various embodiments of the disclosure may be applied to other communication systems having similar technical backgrounds or channel forms. Further, various embodiments of the disclosure may also be applied to other communication systems through some modifications without significantly departing from the range of the disclosure based on determination of those skilled in the technical knowledge.

Hereafter, terms for identifying access nodes, terms indicating network entities, terms indicating messages, terms indicating interfaces between network entities, terms indicating various identification information, and the like are illustratively used in the description for the sake of convenience. Accordingly, the disclosure is not limited by the terms as used, and other terms indicating subjects having equivalent technical meanings may be used.

In addition, the disclosure describes various embodiments using terms used in some communication standard (e.g., 3GPP), but this is only an example for description. Various embodiments of the disclosure may be easily modified and applied in other communication systems. Hereafter, some terms used in a core network of the disclosure are predefined.

AMF Access and Mobility Management Function
CN Core Network
CNF Containerized Network Function
DNN Data Network Name
PCF Policy Control Function
HSS Home Subscriber Server
SMF Session Management Function
UDM User Data Management
UPF User Plane Function
CNF Containerized Network Function
VNF Virtual Network Function FIG. 1A illustrates a communication network including core network entities in a wireless communication system according to various embodiments of the disclosure. A 5G mobile communication network may include a 5G UE 110, a 5G RAN 120, and a 5G core network.

The 5G core network may include network functions such as an AMF 150 which provides a mobility management function of the UE, an SMF 160 which provides a session management function, a UPF 170 which delivers data, a PCF 180 which provides a policy and charging function, a UDM 153 which provides a data management function such as subscriber data or policy control data, or a unified data repository (UDR) which stores data of various network functions.

Referring to FIG. 1A, the UE 110 may perform communication over a radio channel formed with a base station (e.g., an eNB, a gNB), that is, over an access network. In some embodiments, the UE 110 is a device used by a user, and may be configured to provide a user interface (UI). For example, the UE 110 may be a terminal equipped in a vehicle for driving. In some other embodiments, the UE 110 may be a device performing machine type communication (MTC) operated without user's involvement, or an autonomous vehicle. Besides an electronic device, the UE may be referred to as a 'terminal', a 'vehicle terminal', a 'UE', a 'mobile station', a 'subscriber station', a 'remote terminal', a 'wireless terminal', or a 'user device' or other term having the equivalent technical meaning. As the terminal, a customer-premises equipment (CPE) or a dongle type terminal may be used besides the UE. The CPE is connected to an NG-RAN node like the UE, and may provide the network to other communication equipment (e.g., a laptop).

Referring to FIG. 1A, the AMF 150 provides the function for the access and mobility management based on the UE 110, and each UE 110 may be basically connected to one AMF 150. Specifically, the AMF 150 may perform at least one function of signaling between core network nodes for mobility of 3GPP access networks, an interface (N2 interface) between radio access networks (e.g., the 5G RAN) 120, non-access stratum (NAS) signaling with the UE 110, identifying the SMF 160, and delivering a session management (SM) message between the UE 110 and the SMF 160. Some or all of the functions of the AMF 150 may be supported within a single instance of one AMF 150.

Referring to FIG. 1A, the SMF 160 provides the session management function. If the UE 110 has a plurality of sessions, respective sessions may be managed by different SMFs 160. Specifically, the SMF 160 may perform at least one function of session management (e.g., session establishment, modification and release including tunnel maintenance between the UPF 170 and the AN node), user plane (UP) function selection and control, traffic steering configuration for routing traffic from the UPF 170 to a proper destination, termination of the SM part of the NAS message, downlink data notification (DDN), and an initiator of AN-specific SM information (e.g., deliver to the AN through the N2 via the AMF 150). Some or all functions of the SMF 160 may be supported within a single instance of one SMF 160.

In the 3GPP system, conceptual links interconnecting NFs within the 5G system may be referred to as reference points. The reference point may be referred to as an interface. The following illustrates reference points (hereafter, interchangeably used with the interfaces) included in the 5G system architecture represented in various embodiments of the disclosure.

N1: a reference point between the UE 110 and the AMF 150

N2: a reference point between the (R)AN 120 and the AMF 150

N3: a reference point between the (R)AN 120 and the UPF 170

N4: a reference point between the SMF 160 and the UPF 170

N5: a reference point between the PCF 180 and the AF 130

N6: a reference point between the UPF 170 and the DN 140

N7: a reference point between the SMF 160 and the PCF 180

N8: a reference point between the UDM 153 and the AMF 150

N9: a reference point between two core UPFs 170

N10: a reference point between the UDM 153 and the SMF 160

N11: a reference point between the AMF 150 and the SMF 160

N12: a reference point between the AMF 150 and an authentication server function (AUSF) 151

N13: a reference point between the UDM 153 and the AUSF 151

N14: a reference point between two AMFs 150

Figure 1B:
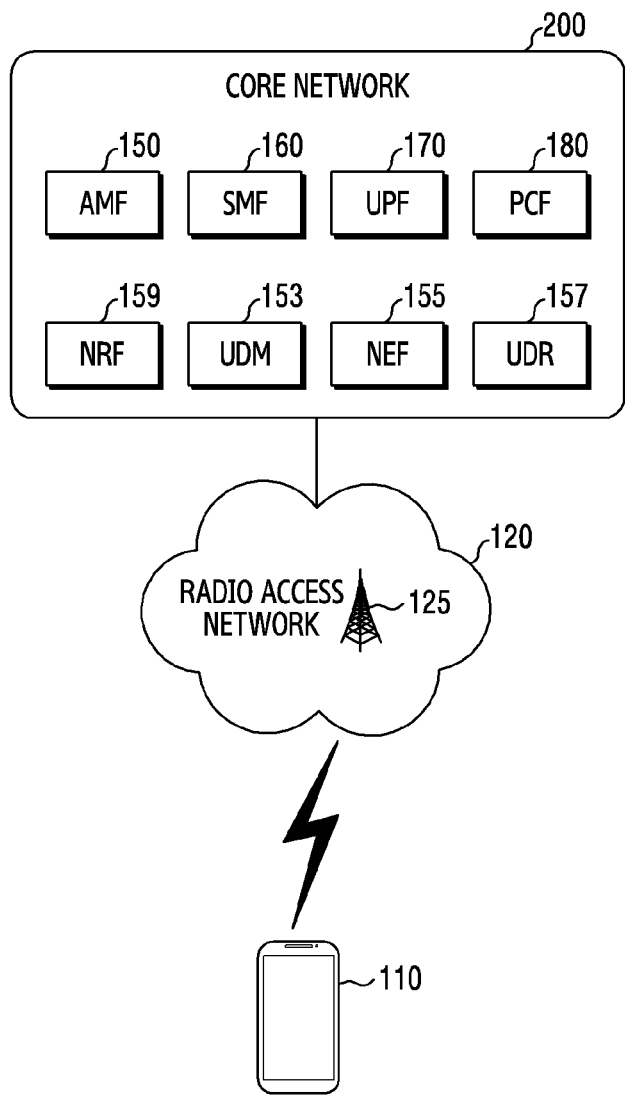
FIG. 1B illustrates a wireless environment including a core network in a wireless communication system according to various embodiments of the disclosure.

N15: a reference point between the PCF 180 and the AMF 150 in a non-roaming scenario, a reference point between the PCF 180 and the AMF 150 within a visited network in a roaming scenario FIG. 1B illustrates a wireless environment including the core network in the wireless communication system according to various embodiments of the disclosure. Referring to FIG. 1B, the wireless communication system includes the RAN 120 and a core network (CN) 200.

The RAN 120 is a network directly connected to a user device, for example, the UE 110, and is an infrastructure which provides radio access to the UE 110. The RAN 120 may include a set of base stations including a base station 125, and the plurality of the base stations may perform communication via interfaces established between them. At least some of the interfaces between the plurality of the base stations may be wired or wireless. The base station 125 may have a structure divided into a central unit (CU) and a distributed unit (DU). In this case, a single CU may control a plurality of DUs. The base station 125 may be referred to as, in addition to the base station, an 'access point (AP)', a 'gNB', a '5G node', a 'wireless point', a 'transmission/reception point (TRP)', or other term having the equivalent technical meaning. The UE 110 accesses the RAN 120, and communicates with the base station 125 over a radio channel. The UE 110 may be referred to as, in addition to the terminal, a 'UE', a 'mobile station', a 'subscriber station', a 'remote terminal', a 'wireless terminal', a 'user device' or other term having the equivalent technical meaning.

The CN 200, which is a network for managing the whole system, controls the RAN 120 and processes data and control signals of the UE 110 transmitted or received over the RAN 120. The CN 200 performs various functions such as controlling the user plane and the control plane, processing mobility, managing subscriber information, charging, and interworking with systems of other types (e.g., the LTE system). To carry out the described various functions, the CN 200 may include a plurality of entities functionally separated with different NFs. For example, the CN 200 may include the AMF 150, the SMF 160, the UPF 170, the PCF 180, a network repository function (NRF) 159, the UDM 153, a network exposure function (NEF) 155, and a UDR 157.

The UE 110 may be connected to the RAN 120 to access the AMF 150 which performs the mobility management function of the CN 200. The AMF 150 may be a function or a device which manages both the access of the RAN 120 and the mobility management of the UE 110. The SMF 160 is an NF which manages the session. The AMF 150 may be connected to the SMF 160, and the AMF 150 may route a session related message of the UE 110 to the SMF 160. The SMF 160 is connected to the UPF 170 to allocate a user plane resource to be provided to the UE 110, and to establish a tunnel for transmitting data between the base station 125 and the UPF 170. The PCF 180 may control policy and charging related information of a session used by the UE 110.

The NRF 159 performs a function of storing information of NFs installed in the mobile communication provider network, and notifying the stored information. The NRF 159 may be connected to all of the NFs. The NFs each, if initiating its driving in the provider network, may register at the NRF 159 and thus notify the NRF 159 that the corresponding NF is operating in the network. The UDM 159 is an NF performing a similar role to a home subscriber server (HSS) of the 4G network, and may store subscription information of the UE 110, or context used by the UE 110 in the network.

The NEF 155 may interconnect a 3rd party server and the NF in the 5G mobile communication system. Also, the NEF 155 may provide data to the UDR 157, or update or acquire data. The UDR 157 may store the subscription information of the UE 120, store the policy information, store data exposed to outside, or store necessary information of a 3rd party application. In addition, the UDR 157 may provide the stored data to other NF.

Figure 2A:
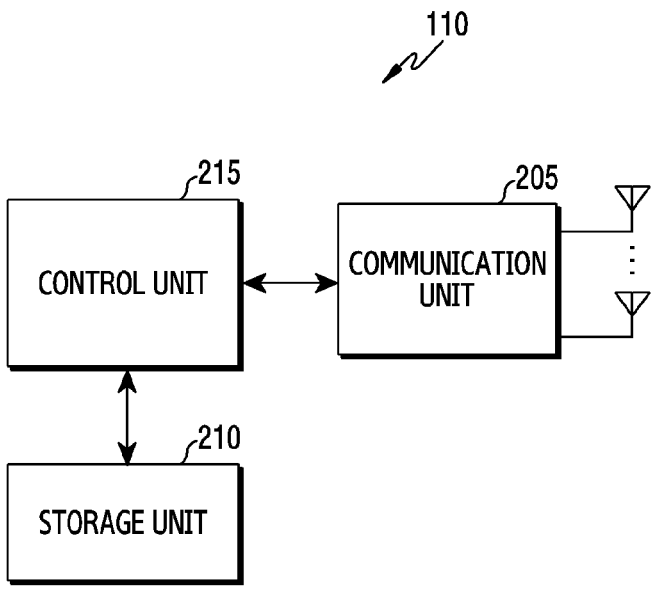
FIG. 2A illustrates an example of a functional structure of a terminal according to embodiments of the disclosure.

FIG. 2A illustrates an example of a functional structure of a terminal according to embodiments of the disclosure. The configuration illustrated in FIG. 2A may be understood as the configuration of the UE 110. Hereafter, a term such as '~unit' or '~er' used hereafter indicates a unit for processing at least one function or operation, and may be implemented using hardware, software, or a combination of hardware and software.

Referring to FIG. 2A, the terminal includes a communication unit 205, a storage unit 210, and a control unit 215.

The communication unit 205 may perform functions for transmitting or receiving a signal over a radio channel. For example, the communication unit 205 may perform a conversion function between a baseband signal and a bit stream according to a physical layer standard of the system. For example, in data transmission, the communication unit 205 may generate complex symbols by encoding and modulating a transmit bit stream. Also, in data reception, the communication unit 205 may restore a receive bit stream by demodulating and decoding a baseband signal. Also, the communication unit 205 up-converts a baseband signal into a radio frequency (RF) band signal and transmits the same via an antenna, and down-converts an RF band signal received through an antenna into a baseband signal. For example, the communication unit 205 may include a transmit filter, a receive filter, an amplifier, a mixer, an oscillator, a digital to analog converter (DAC), an analog to digital converter (ADC), and so on.

Also, the communication unit 205 may include a plurality of transmit and receive paths. Further, the communication unit 205 may include at least one antenna array including a plurality of antenna elements. In terms of hardware, the communication unit 205 may include a digital circuit and an analog circuit (e.g., a radio frequency integrated circuit (RFIC)). Herein, the digital circuit and the analog circuit may be implemented in a single package. The communication unit 205 may include a plurality of RF chains. Further, the communication unit 205 may perform the beamforming.

The communication unit 205 transmits and receives the signal as described above. Accordingly, whole or a part of the communication unit 205 may be referred to as a 'transmitter', a 'receiver', or a 'transceiver'. Also, the transmission and reception conducted over the radio channel is used to embrace the above-described processing performed by the communication unit 205 in the following description.

The storage unit 210 may store data such as a basic program, an application program, and setting information for the operation of the terminal. The storage unit 210 may be configured with a volatile memory, a non-volatile memory, or a combination of a volatile memory and a non-volatile memory. The storage unit 210 may provide the stored data at a request of the control unit 215.

The control unit 215 controls general operations of the terminal. For example, the control unit 215 may transmit and receive a signal through the communication unit 205. In addition, the control unit 215 may record and read data in and from the storage unit 210. The control unit 215 may perform functions of a protocol stack required by the communication standard. For doing so, the control unit 215 may include at least one processor or a micro-processor, or may be a part of a processor. A part of the communication unit 205 and the control unit 215 may be referred to as a communication processor (CP). According to various embodiments, the control unit 215 may control to perform synchronization using the wireless communication network. For example, the control unit 215 may control the terminal to perform operations according to various embodiments to be described.

According to various embodiments of the disclosure, the terminal may include a mobile equipment (ME) and a universal mobile telecommunications service (UMTS) subscriber identity module (USIM). The ME may include a mobile terminal (MT) and a terminal equipment (TE). The MT may be a part for operating a radio access protocol, and the TE may be a part for operating a control function. For example, a wireless communication terminal (e.g., a mobile phone) may integrate the MT and the TE, and a notebook may separate the MT and the TE. The disclosure may describe the ME and the USIM, but not limited to, as the separate entities, according to the operations of each configuration, but it is noted that various embodiments of the disclosure may be described with the terminal (e.g., the UE) including the ME and the USIM or with the ME as the terminal.

Figure 2B:
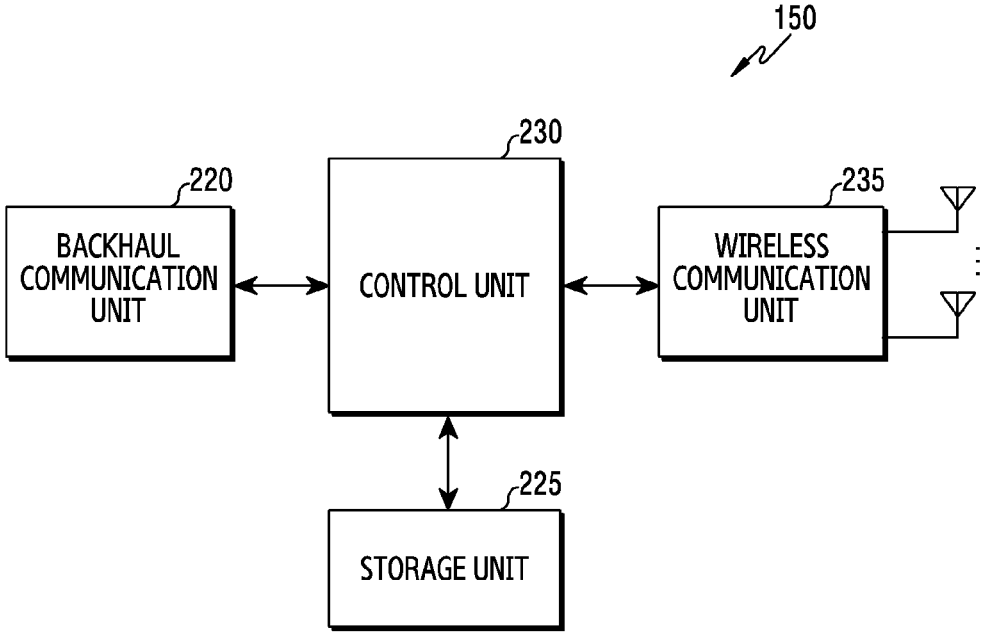
FIG. 2B illustrates an example of a functional structure of a base station according to embodiments of the disclosure.

FIG. 2B illustrates an example of a functional structure of a base station according to embodiments of the disclosure. The configuration illustrated in FIG. 2B may be understood as the configuration of the base station 120. Hereafter, a term such as 'unit' or '—er' used hereafter indicates a unit for processing at least one function or operation, and may be implemented using hardware, software, or a combination of hardware and software.

Referring to FIG. 2B, the base station may include a wireless communication unit 235, a backhaul communication unit 220, a storage unit 225, and a control unit 230.

The wireless communication unit 235 may perform functions for transmitting or receiving a signal over a radio channel. For example, the wireless communication unit 235 may perform a conversion function between a baseband signal and a bit stream according to the physical layer standard of the system. For example, in data transmission, the communication unit 235 generates complex symbols by encoding and modulating a transmit bit stream. Also, in data reception, the wireless communication unit 235 restores a receive bit stream by demodulating and decoding a baseband signal.

Also, the wireless communication unit 235 may up-convert a baseband signal into an RF band signal and transmits the same via an antenna, and down-converts an RF band signal received through an antenna into a baseband signal. For doing so, the wireless communication unit 235 may include a transmit filter, a receive filter, an amplifier, a mixer, an oscillator, a DAC, an ADC, and the like. Also, the wireless communication unit 235 may include a plurality of transmit and receive paths. Further, the wireless communication unit 235 may include at least one antenna array including a plurality of antenna elements.

In terms of hardware, the wireless communication unit 235 may include a digital circuit and an analog circuit, and the analog unit may include a plurality of sub-units according to an operating power, an operating frequency, and so on. The digital unit may be implemented with at least one processor (e.g., a digital signal processor (DSP)).

The wireless communication unit 235 transmits and receives the signal as described above. Accordingly, whole or a part of the wireless communication unit 235 may be referred to as a 'transmitter', a 'receiver', or a 'transceiver'. In addition, in the following description, the transmission and reception conducted over the radio channel may be used to embrace the above-described processing performed by the wireless communication unit 235.

The backhaul communication unit 220 may provide an interface for communicating with other nodes in the network. That is, the backhaul communication unit 220 may convert a bit stream transmitted from the base station to other node, for example, other access node, another base station, an upper node, a core network, and so on, into a physical signal, and convert a physical signal received from other node into a bit stream.

The storage unit 225 may store data such as a basic program, an application program, and setting information for the operations of the base station. The storage unit 225 may be configured with a volatile memory, a non-volatile memory or a combination of a volatile memory and a non-volatile memory. The storage unit 225 may provide the stored data at a request of the control unit 240.

The control unit 230 may control general operations of the base station. For example, the control unit 230 may transmit and receive a signal through the wireless communication unit 235 or the backhaul communication unit 220. In addition, the control unit 230 may record and read data in and from the storage unit 225. The control unit 230 may perform functions of a protocol stack required by the communication standard. According to another implementation, the protocol stack may be included in the wireless communication unit 235. For doing so, the control unit 230 may include at least one processor. According to various embodiments, the control unit 230 may control the synchronization using the wireless communication network. For example, the control unit 230 may control the base station to perform operations according to the various embodiments to be described below.

Figure 2C:
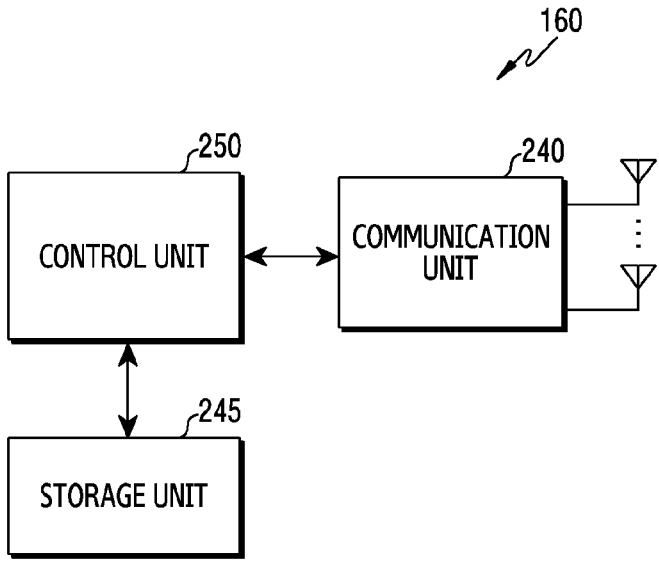
FIG. 2C illustrates an example of a functional structure of a core network entity according to embodiments of the disclosure.

FIG. 2C illustrates an example of a functional structure of a core network entity according to embodiments of the disclosure. FIG. 2C illustrates a configuration of the core network entity in the wireless communication system according to various embodiments of the disclosure. The configuration shown in FIG. 2C may be understood as the configuration of the device having at least one function among the network entities including the AMF 150 of FIG.

1. Hereafter, a term such as '~unit' or '~er' used hereafter indicates a unit for processing at least one function or operation, and may be implemented using hardware, software, or a combination of hardware and software.

Referring to FIG. 2C, the core network entity may include a communication unit 240, a storage unit 245, and a control unit 250.

The communication unit 240 may provide an interface for communicating with other nodes in the network. That is, the communication unit 240 may convert a bit stream transmitted from the core network entity to other device into a physical signal, and converts a physical signal received from other device into a bit stream. That is, the communication unit 240 may transmit and receive signals. Hence, the communication unit 240 may be referred to as a modem, a transmitter, a receiver or a transceiver. In this case, the communication unit 240 enables the core network entity to communicate with other devices or systems via a backhaul connection (e.g., wired backhaul or wireless backhaul) or the network.

The storage unit 245 may store data such as a basic program, an application program, and setting information for the operations of the core network entity. The storage unit 245 may be configured with a volatile memory, a non-volatile memory, or a combination of a volatile memory and a non-volatile memory. The storage unit 245 may provide the stored data at a request of the control unit 250.

The control unit 250 controls general operations of the core network entity. For example, the control unit 250 may transmit and receive a signal through the communication unit 240. In addition, the control unit 250 may record and read data in and from the storage unit 245. For doing so, the control unit 250 may include at least one processor. According to various embodiments of the disclosure, the control unit 250 may control to perform the synchronization using the wireless communication network. For example, the control unit 250 may control the core network entity to perform operations according to various embodiments to be described.

Hereafter, terms for identifying access nodes, terms indicating network entities, terms indicating messages, terms indicating interfaces between network entities, terms indicating various identification information, and the like are illustratively used in the description for the sake of convenience. Accordingly, the disclosure is not limited by the terms as used, and other terms indicating subjects having equivalent technical meanings may be used.

To facilitate the description, terms and names defined in 5G system (5GS) and NR standards, which are the latest standard defined by the 3GPP among the currently existing communication standards, shall be used. However, the disclosure is not limited by the terms and the names, and may be equally applied to wireless communication networks which comply with other standards. Particularly, the disclosure may be applied to the 3GPP 5G mobile communication standard (e.g., 5GS and NR).

As described above, the fake base station may defraud or forge the SI of the genuine base station to be accessed by the UE. To address this problem, various methods may be used.

Figure 3:
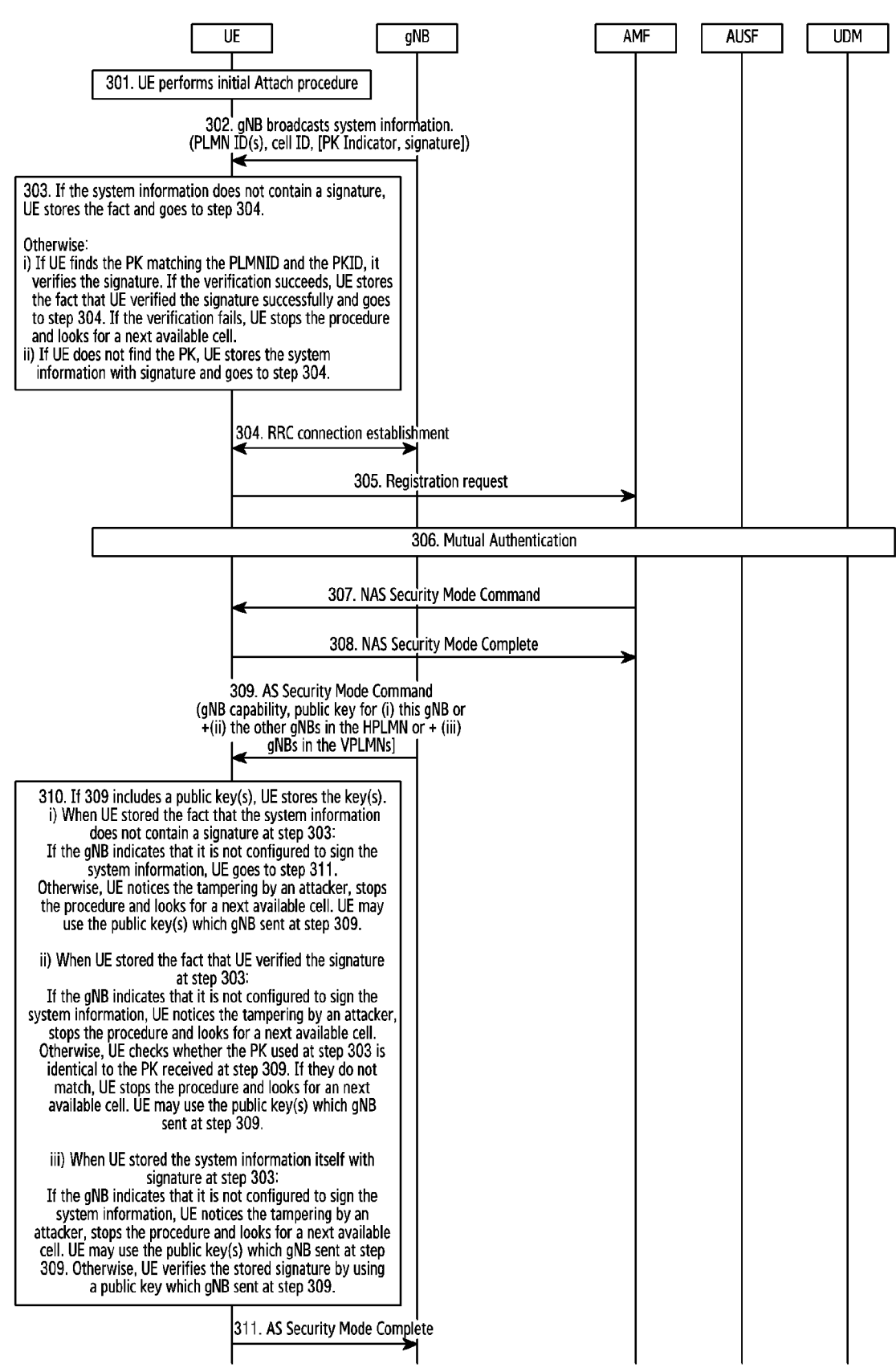
FIG. 3 illustrates a flowchart for authenticating a base station by a user equipment (UE) according to an embodiment of the disclosure.

FIG. 3 illustrates a flowchart of a UE for authenticating a base station according to an embodiment of the disclosure.

One or more of the following configurations may be performed in advance for the procedure of FIG. 3.
First Pre-Configuration The base station may have a public key for signature verification of other base stations as well as its public key for the signature verification.

Referring to FIG. 3, in operation 301, the UE may perform an initial attach procedure (or attach procedure or connection procedure). That is, according to an embodiment of the disclosure, the UE may register at a network through the initial attach procedure, and perform authentication and security related procedures with the network. However, the initial attach procedure of operation 301 may be omitted according to an embodiment.

In operation 302, the gNB may broadcast SI together with the signature and an indicator indicating the public key required for the signature verification. In addition, the SI transmitted by the base station may include at least one of a cell ID related to the base station, a public land mobile network (PLMN) ID, and a variable value (e.g., a time counter, a timer value, etc.) for the retransmission prevention.

According to an embodiment, the gNB may sign the SI using a private key. That is, the gNB may sign using an asymmetric key scheme. Unlike a symmetric key scheme using a single shared key, the asymmetric key scheme may include the public key and the private key. The asymmetric key based scheme may include a certificate based digital signature scheme and an ID based signature scheme.

More specifically, in the certificate based digital signature scheme, the base station may sign using the private key of a pair of the private key and the public key, and the UE may verify the signature using the public key (e.g., included in the certificate) of the base station. According to an embodiment, the UE may own a public key of a root certificate authority (CAS) which issues the certificate to the base station. In the ID based signature scheme, the UE may verify the signature using an ID and a key management service (KMS) public key.

In operation 303, if the SI broadcast by the gNB contains no signature, the UE may perform operation 304. If the SI broadcast by the gNB contains the signature and the UE has (or obtains) the indicator indicating the public key, the UE may verify the signature of the SI. If the verification is successful, the UE may store the information that the signature is successful, and if the verification fails, the UE may stop the procedure and leave the gNB (or a cell of the gNB) where the SI is received and select another cell. That is, if the verification fails, the UE may scan another base station.

According to an embodiment, it may be assumed that the UE owns the public key (the public key of the root CA or the KMS public key). Also, the UE may additionally receive a public key from the AMF or other network entity, and update the old public key stored.

According to an embodiment of the disclosure, the UE may store the public key in the USIM or the ME. Notably, the UE may store the public key in another storage of the UE, and may store in other device such as an external server.

According to an embodiment, if the SI broadcast by the gNB contains the signature and the public key for the signature verification is not found in the UE, the UE may store the SI together with the signature and perform operation 304.

The UE and the gNB may establish a radio resource control (RRC) connection in operation 304, and transmit a registration request message to the AMF via the gNB in operation 305.

In operation 306, the UE and the network may perform mutual authentication.

In operation 307, the AMF may select a NAS ciphering algorithm and an integrity protection algorithm and transmit a NAS security mode command message, and create a NAS cipher key and an integrity protection key using the selected algorithm. The NAS security mode command message may be a message integrity-protected first among NAS messages.

In operation 308, the UE may create a NAS cipher key and an integrity protection key using the ciphering algorithm and the integrity protection algorithm received in operation 307, and transmit a NAS security mode complete message encrypted and integrity-protected using the NAS cipher key and the integrity protection key. The NAS security mode complete message may be a message encrypted and integrity-protected first among NAS messages.

In operation 309, the gNB may transmit corresponding gNB capability for signing the SI, as well as at least one of a public key for the corresponding gNB, a public key for other gNB(s) of a home PLMN (HPLMN) or a public key for other gNB(s) of virtual PLMN(s) (VPLMN(s)), in an AS security mode command message integrity-protected.

In other words, the signing capability information (or signature performance information) may include information indicating whether the gNB broadcasts the SI by including the signature, information indicating whether the SI includes the signature, or information indicating whether the gNB broadcasts the signed SI.

According to an embodiment, the AS security mode command may deliver the signing capability information to the UE. The AS security mode command message may be a message integrity-protected first among AS messages.

In operation 310, if the AS security mode command message received in operation 309 includes the public key, the UE may store the public key of the AS security mode command message.

According to an embodiment, if the SI broadcast by the gNB contains no signature, the UE stores the information that there is no signature in operation 303 and the gNB transmits the information indicating no (or impossible) SI signing capability in operation 309, the UE may perform operation 311.

According to an embodiment, the gNB may not transmit SI signing capability information, instead of the information indicating no SI signing capability. In this case, the UE may determine no SI signing capability of the gNB.

According to an embodiment, if the UE stores the information that there is no signature in operation 303 but finds out the signing capability of the gNB in operation 309, the UE may identify an attack of a fake base station. That is, the UE may identify that the gNB which the UE received the SI is fake.

According to an embodiment, if determining that the gNB which the UE received SI is the fake base station, the UE may stop the attach procedure (initial attach procedure or connection procedure) (e.g., the cell attach procedure) with the gNB through the gNB which the UE received the SI and search for another cell (or gNB).

According to an embodiment, the UE may scan (or search) another cell and the gNB may verify SI signature of another base station using the signature verification public key contained in the AS security mode command message integrity-protected.

According to an embodiment, if the UE successfully verifies the SI signature of the gNB and stores the information that the signature verification is successful in operation 303 but no SI signing capability of the gNB is indicated in operation 309, the UE may identify an attack of the fake base station. That is, if there is no signing capability of the gNB providing the SI, the UE may identify that the gNB receiving the SI is fake. In other words, since the SI received by the UE contains the signature, the UE may identify the attack of the fake base station.

According to an embodiment, if determining that the gNB which the UE received SI is the fake base station, the UE may stop the attach procedure (initial attach procedure or connection procedure) (e.g., the cell attach procedure) with the gNB through the gNB which the UE received the SI, and search for another cell (or gNB).

According to an embodiment, if the UE stores the information that the signature verification is successful in operation 303 and the SI signing capability of the gNB is indicated in operation 309, the UE may determine whether the public key used for the signature verification matches the public key provided by the gNB in operation 309.

According to an embodiment, if the public key used for the signature verification is compared with the public key provided by the gNB in operation 309 and the public key used for the signature verification is different from the public key provided by the gNB in operation 309, the UE may stop the attach procedure (initial attach procedure or connection procedure) (e.g., the cell attach procedure) with the gNB through the gNB which the UE received the SI, and search for another cell (or gNB).

According to an embodiment, if the SI contains the signature, the UE, which has no public key for the signature verification, stores the SI together with the signature in operation 303 and no SI signing capability of the gNB is indicated in operation 309, the UE may stop the attach procedure (initial attach procedure or connection procedure) (e.g., the cell attach procedure) with the gNB through the gNB which the UE received the SI, and search for another cell (or gNB).

According to an embodiment, if the UE stores the SI together with the signature in operation 303, the SI signing capability of the gNB is indicated and the public key for the signature verification is delivered in operation 309, the UE may verify the stored SI signature using the public key received in operation 309 and identify that the SI is not tampered.

In operation 311, the UE may transmit an AS security mode complete message. The AS security mode complete message may be a message encrypted and integrity-protected first among AS messages.

Figure 4:
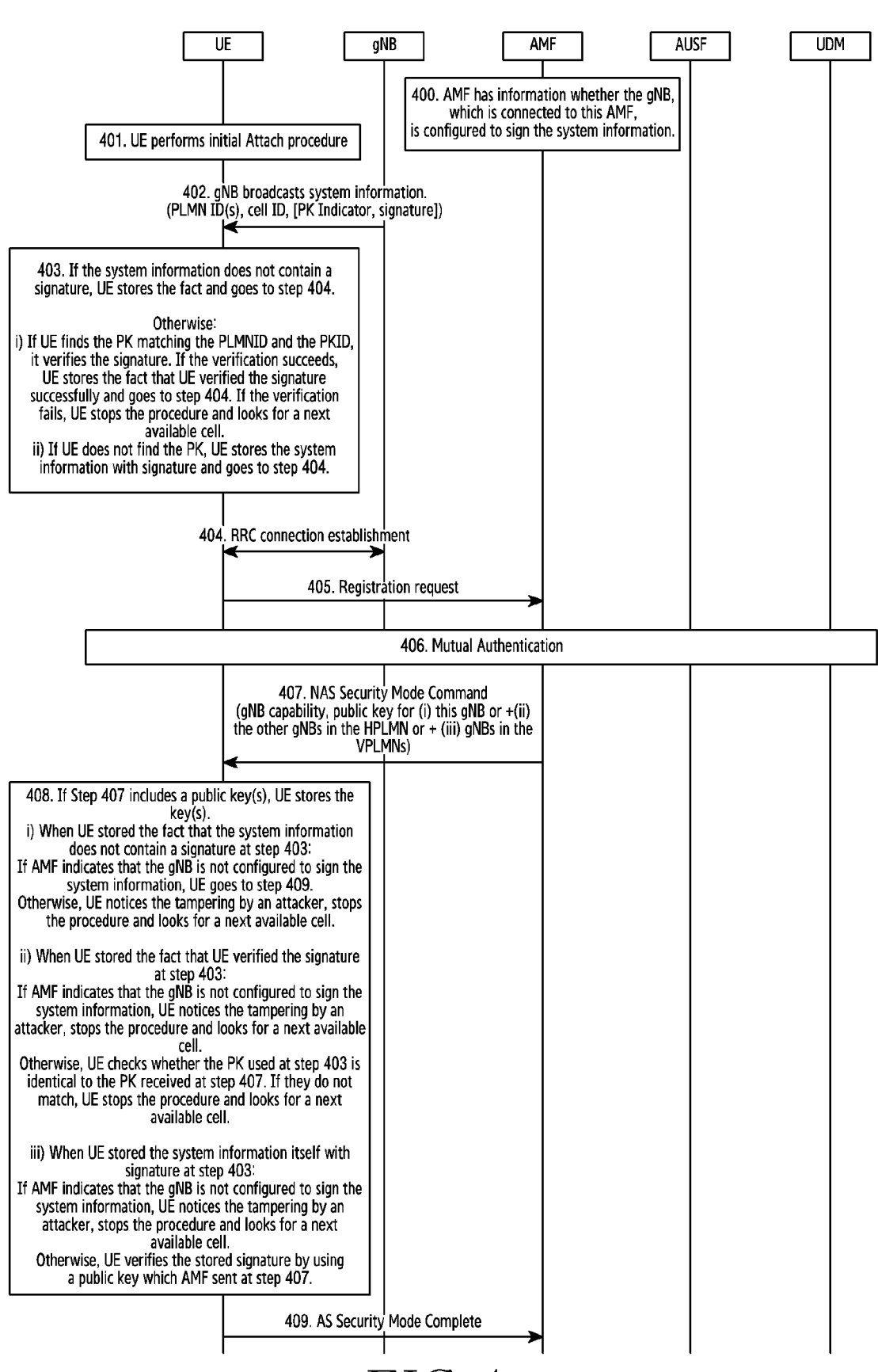
FIG. 4 illustrates a flowchart for authenticating a base station by a UE according to an embodiment of the disclosure.

FIG. 4 illustrates a flowchart of a UE for authenticating a base station according to an embodiment of the disclosure. FIG. 4 provides a method for receiving signing capability of SI of the base station using a NAS security command instead of the AS security command of FIG. 3.

One or more of the following configurations may be performed in advance for the procedure shown in FIG. 4.
First Pre-Configuration The AMF may have a signature verification public key of other gNBs as well as a signature verification public key of gNBs connectable with the AMF.
Second Pre-Configuration The AMF may have signing capability information of gNBs connectable with the AMF.

Referring to FIG. 4, in operation 401, the UE may perform an initial attach procedure. That is, according to an embodiment of the disclosure, the UE may register at a network through the initial attach procedure, and perform authentication and security related procedures with the network. However, the initial attach procedure of operation 401 may be omitted according to an embodiment.

In operation 402, the gNB may broadcast SI together with a signature and an indicator indicating a public key for the signature verification. In addition, the SI transmitted by the gNB may include at least one of a cell ID related to the gNB, a PLMN ID, and a variable value (e.g., a time counter, a timer value, etc.) for the retransmission prevention.

According to an embodiment, the gNB may sign the SI using a private key. That is, the gNB may sign using the asymmetric key based scheme. Unlike the symmetric key scheme using a single shared key, the asymmetric key scheme may include the public key and the private key. The asymmetric key scheme may include a certificate based digital signature scheme and an ID based signature scheme.

More specifically, in the certificate based digital signature scheme, the gNB may sign using the private key of the pair of the private key and the public key, and the UE may verify the signature using the public key (e.g., included in the certificate) of the gNB. According to an embodiment, the UE may own a public key of a CAS which issues the certificate to the gNB. In the ID based signature scheme, the UE may verify the signature using an ID and a KMS public key.

In operation 403, if the SI broadcast by the gNB contains no signature, the UE may perform operation 404. If the SI broadcast by the gNB contains the signature and the UE finds the indicator indicating the public key, the UE may verify the signature of the SI. If the verification is successful, the UE may store the information that the signature is successful, and if the verification fails, the UE may stop the procedure, leave the gNB (or a cell of the gNB) where the SI is received and select another cell. That is, if the verification fails, the UE may scan another gNB.

According to an embodiment, it may be assumed that the UE owns the public key (the public key of the root CA or the KMS public key). Also, the UE may additionally receive a public key from the AMF or other network entity, and update the old public key stored.

According to an embodiment of the disclosure, the UE may store the public key in the USIM or the ME. Notably, the UE may store the public key in another storage of the UE.

According to an embodiment, if the SI broadcast by the gNB contains the signature and the public key for the signature verification is not found in the UE, the UE may store the SI together with the signature and perform operation 404.

The UE and the gNB may establish an RRC connection in operation 404, and the UE may transmit a registration request message to the AMF via the gNB in operation 405.

In operation 406, the UE and the network may perform mutual authentication.

In operation 407, the AMF may transmit at least one of gNB capability for signing the SI as well as the public key for the corresponding gNB connected by the UE, a public key for other gNB(s) of a HPLMN or a public key for other gNB(s) of VPLMN(s), in a NAS security mode command message integrity-protected.

In other words, the AMF may transmit to the UE, the capability information including the information of whether the signature is contained in the SI or whether the gNB broadcasts the signed SI, such as information indicating whether the gNB supports a capability of broadcasting the SI by including the signature or information indicating whether the gNB supports the SI signature, through the NAS security mode command.

The AMF may select a NAS ciphering algorithm and an integrity protection algorithm, transmit NAS ciphering algorithm and integrity protection algorithm information through a NAS security mode command message, and create a NAS cipher key and an integrity protection key using the selected algorithm. The NAS security mode command message may be a message integrity-protected first among NAS messages.

In operation 408, if the AS security mode command message received in operation 407 includes the public key, the UE may store the public key contained in the NAS security mode command message.

According to an embodiment, if the SI broadcast by the gNB contains no signature and the UE stores the information that there is no signature in operation 403 and the AMF transmits the information indicating no (or impossible) SI signing capability of the gNB in operation 407, the UE may perform operation 409.

According to an embodiment, the AMF may not transmit the capability information of the gNB for signing the SI, instead of the information indicating no SI signing capability. In this case, the UE may determine no SI signing capability of the gNB.

According to an embodiment, if the UE stores the information that there is no signature in operation 403 but finds out the signing capability of the corresponding gNB in operation 407, the UE may identify an attack of a fake base station. That is, the UE may identify that the gNB which the UE received the SI is fake.

According to an embodiment, if determining that the gNB which the UE received SI is the fake base station, the UE may stop the attach procedure (initial attach procedure or connection procedure) (e.g., the cell attach procedure) with the gNB through the gNB which the UE received the SI and search for another cell (or gNB).

The UE may scan (or search) another cell, and verify SI signature of another gNB using the signature verification public key contained in the integrity-protected AS security mode command message in operation 407.

According to an embodiment, if the UE successfully verifies the SI signature of the gNB and stores the information that the signature verification is successful in operation 403 but the AMF indicates no SI signing capability in operation 407, the UE may identify an attack of the fake base station. That is, if there is no signing capability of the gNB providing the SI, the UE may identify that the gNB which the UE received the SI is fake. In other words, since the SI received by the UE contains the signature, the UE may identify the attack of the fake base station.

According to an embodiment, if determining that the gNB which the UE received SI is the fake base station, the UE may stop the attach procedure (initial attach procedure or connection procedure) (e.g., the cell attach procedure) with the gNB through the gNB which the UE received the SI, and search for another cell (or gNB).

According to an embodiment, if the UE stores the information that the signature verification is successful in operation 403 and the AMF indicates the SI signing capability in operation 407, the UE may determine whether the public key used for the signature verification matches the public key provided by the gNB in operation 407.

According to an embodiment, if the public key used for the signature verification is compared with the public key provided by the gNB in operation 407 and the public key used for the signature verification is different from the public key provided by the gNB in operation 407, the UE may stop the attach procedure (initial attach procedure or connection procedure) (e.g., the cell attach procedure) with the gNB through the gNB which the UE received the SI, and search for another cell (or gNB).

According to an embodiment, if the SI contains the signature, the UE, which has no public key for the signature verification, stores the SI together with the signature in operation 403 and the AMF indicates no SI signing capability in operation 407, the UE may stop the attach procedure (initial attach procedure or connection procedure) (e.g., the cell attach procedure) with the gNB through the gNB which the UE received the SI, and search for another cell (or gNB).

According to an embodiment, if the UE stores the SI together with the signature in operation 403 and the AMF indicates the SI signing capability and transmits the public key for the signature verification in operation 407, the UE may verify the stored SI signature using the public key received in operation 407 and identify that the SI is not tampered.

In operation 409, the UE may transmit a NAS security mode complete message. The UE may create a NAS cipher key and an integrity protection key using the ciphering algorithm and the integrity protection algorithm received in operation 407. The NAS security mode complete message may be a message encrypted and integrity-protected first among AS messages.

Figure 5:
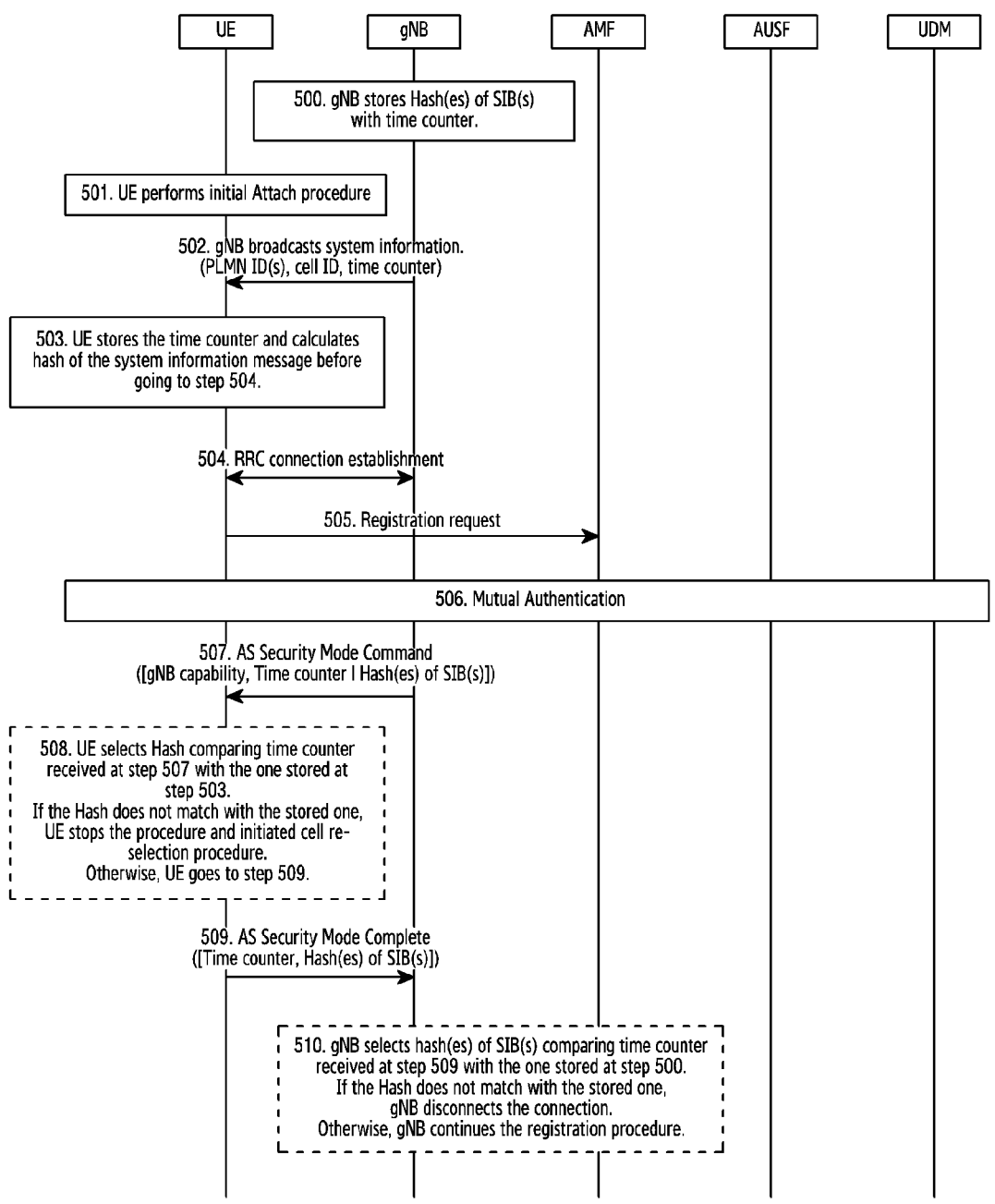
FIG. 5 illustrates a flowchart for authenticating a base station by a UE according to an embodiment of the disclosure.

FIG. 5 illustrates a flowchart of a UE for authenticating a base station according to an embodiment of the disclosure. FIG. 5 provides a method for authenticating the base station using a hash algorithm agreed between the UE and the base station.

The following configurations may be performed in advance for the procedure shown in FIG. 5.

First Pre-Configuration

The base station may store hash value(s) of the SI message, together with a variable value (e.g., a time counter, a timer value, etc.) of the SI or the SI including the SI variable value.

Referring to FIG. 5, in operation 501, the UE may perform an initial attach procedure. That is, according to an embodiment of the disclosure, the UE may register at a network through the initial attach procedure, and perform authentication and security related procedures with the network. However, the initial attach procedure of operation 501 may be omitted according to an embodiment.

In operation 502, the gNB may broadcast SI including a time counter value. In addition, the SI transmitted by the gNB may include at least one of a cell ID and a PLMN ID related to the gNB. FIG. 5 describes the time counter value to ease the understanding, but the variable value of the SI may be included instead of the time counter value, which is not limited to the above example.

In operation 503, the UE may calculate a hash value of the SI, store the hash value and the variable value (e.g., the time counter) or the SI including the variable value and then perform a next operation.

The UE and the gNB may establish an RRC connection in operation 504, and the UE may transmit a registration request message to the AMF via the gNB in operation 505.

In operation 506, the UE and the network may perform mutual authentication.

In operation 507, the gNB may transmit at least one of the SI including whether the gNB connected by the UE supports a base station authentication mechanism using the hash value and the variable value (e.g., the time counter) stored in based on the first pre-configuration or the SI including corresponding value and the hash of a SIB message mapped to the SI, through an integrity-protected AS security mode command message.

That is, if the gNB does not support the base station authentication mechanism using the hash value, the UE, which calculates the hash value in operation 503, may not transmit the calculated hash value in operation 509.

The gNB may select an AS ciphering algorithm and an integrity protection algorithm, transmit AS ciphering algorithm and integrity protection algorithm information through an AS security mode command message, and create an AS cipher key and an integrity protection key using the selected algorithm. The AS security mode command message may be a message integrity-protected first among AS messages.

In operation 508, if the AS security mode command message received by the UE in operation 507 includes the variable value (e.g., the time counter, the timer value, etc.) or the SI including the corresponding value and the hash value corresponding to the SI, the UE may select a hash value mapped to the same value as the variable value (e.g., the time counter) or the SI including the variable value stored in operation 503, among the hash values received in operation 507. If the hash value selected from the received hash values in operation 507 matches the hash value calculated in operation 503, the UE may perform operation 509. If the hash is different, the UE may stop the procedure, leave the gNB (or a cell of the gNB) where the SI is received and select another cell.

According to an embodiment, if the gNB does not transmit the hash value mapped to the variable value and the SI but transmits the indicator indicating that the gNB supports the base station authentication mechanism using the hash value in operation 507, the UE may transmit the hash value calculated in operation 503 and the variable value (e.g., the time counter) received in operation 502.

According to an embodiment, if the gNB transmit neither the variable value and the hash value mapped to the SI nor the indicator indicating that the gNB supports the base station authentication mechanism using the hash value in operation 507, the UE may not transmit the hash value and the variable value in operation 509.

In operation 509, if the gNB does not transmit the variable value or the SI including the corresponding value and the hash value corresponding to the SI but transmits the indicator indicating that the gNB supports the base station authentication mechanism using the hash value in operation 507, the UE may transmit the hash value calculated in operation 503 and the variable value (e.g., the time counter) or the SI including the corresponding value received in operation 502.

In operation 510, if the gNB receives the hash value and the variable value (e.g., the time counter) or the SI including the corresponding value from the UE in operation 509, the gNB may select a hash value mapped to the same value as the variable value received from the UE and the variable value stored in operation 500 according to the first pre-configuration or the SI including the corresponding value. If the selected hash value matches the hash value transmitted by the UE in operation 509, the gNB may continue the procedure. If the selected hash value is different from the hash value transmitted by the UE in operation 509, the gNB may disconnect the connection. The UE may transmit an AS security mode complete message. The UE may create an AS cipher key and an integrity protection key using the ciphering algorithm and the integrity protection algorithm received in operation 507. The AS security mode complete message may be a message encrypted and integrity-protected first among AS messages.

Figure 6:
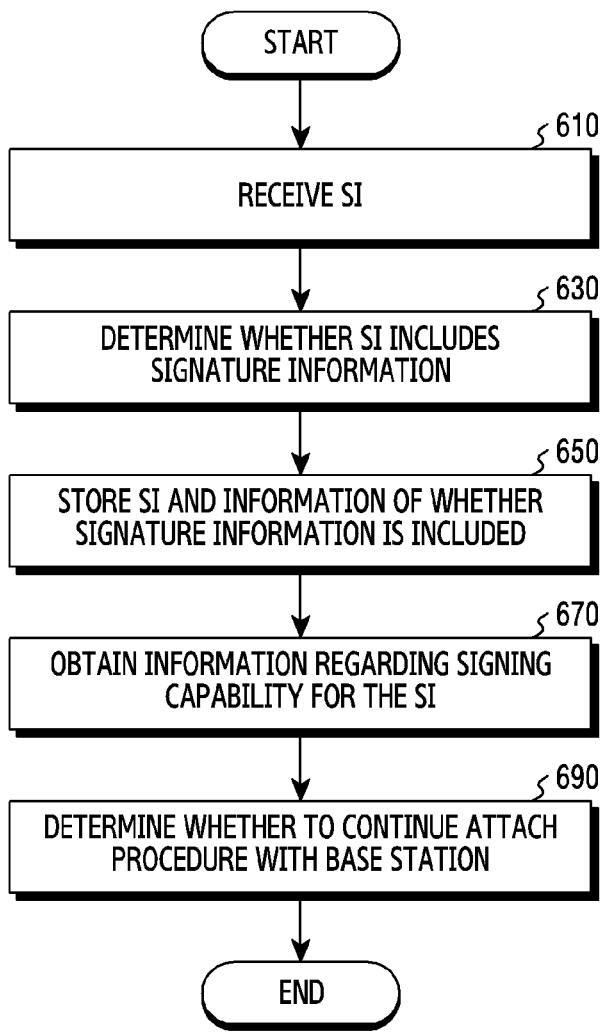
FIG. 6 illustrates a flowchart of a method performed by a UE for authenticating a base station according to embodiments of the disclosure.

FIG. 6 illustrates a flowchart of a method performed by a UE for authenticating a base station according to embodiments of the disclosure.

In operation 610, the UE may receive SI. According to an embodiment of the disclosure, the UE may camp on the base station, and receive the SI.

According to an embodiment, the UE may perform an initial attach procedure with the base station, and register at a network through the initial attach procedure.

In operation 630, the UE may determine whether the SI contains signature information.

According to an embodiment, the SI may or may not include the signature information. Also, the SI may include information related to a public key of the base station. For example, the public key information of the base station may be, but not limited to, a public key ID. In addition, the SI may include, but not limited to, a cell ID, a PLMN ID, and so on.

In operation 650, the UE may store information of whether the signature information is included.

According to an embodiment, the UE may store the SI, store information of whether the signature information is included except for the SI, and store both the SI and the information of whether the signature information is included.

According to an embodiment, if the SI includes the signature information, the UE may determine whether a public key corresponding to the signature information is stored in the UE. If storing the public key, the UE may verify the signature. If not storing the public key, the UE may store the SI and the signature.

According to an embodiment, the UE may determine whether the public key is stored therein, based on the public key information of the SI. If not storing the public key, the UE may request the public key from the AMF via the base station.

According to an embodiment, if the signature information is not included, the UE may store information indicating no signature information included.

In operation 670, the UE may obtain information regarding signing capability for the system information of the base station.

According to an embodiment, the UE may obtain the information regarding signing capability for the system information of the base station, from the base station. The UE may obtain the information regarding signing capability for the system information of the base station from the base station through an AS message. Also, the UE may obtain the information regarding signing capability for the system information of the base station through an AS security mode command.

According to an embodiment, the UE may obtain the information regarding signing capability for the system information of the base station from the AMF via the base station. The UE may obtain the information regarding signing capability for the system information of the base station from the base station using a NAS message. The UE may obtain the information regarding signing capability for the system information of the base station using a NAS security mode command.

In operation 690, the UE may determine whether to continue the attach procedure with the base station.

According to an embodiment, the UE may determine whether to continue the attach procedure (initial attach procedure or connection procedure) with the base station, based on the information stored in operation 650. For example, if the SI does not include the signature information but the base station supports the signing capability for the SI in operation 670, the UE may identify that the base station of the current attach procedure is fake, stop the attach procedure and search for another base station.

According to an embodiment, if the SI includes the signature information, the verification is successful, but the base station does not support the signing capability for the SI, the UE may determine (or identify) that the base station of the current attach procedure is fake, stop the attach procedure (initial attach procedure or connection procedure) and search for another base station.

According to an embodiment, if the SI contains the signature information and the base station does not support the SI signing capability, the UE may determine (or identify) that the base station of the current attach procedure is fake, stop the attach procedure (initial attach procedure or connection procedure) and search for another base station.

Figure 7:
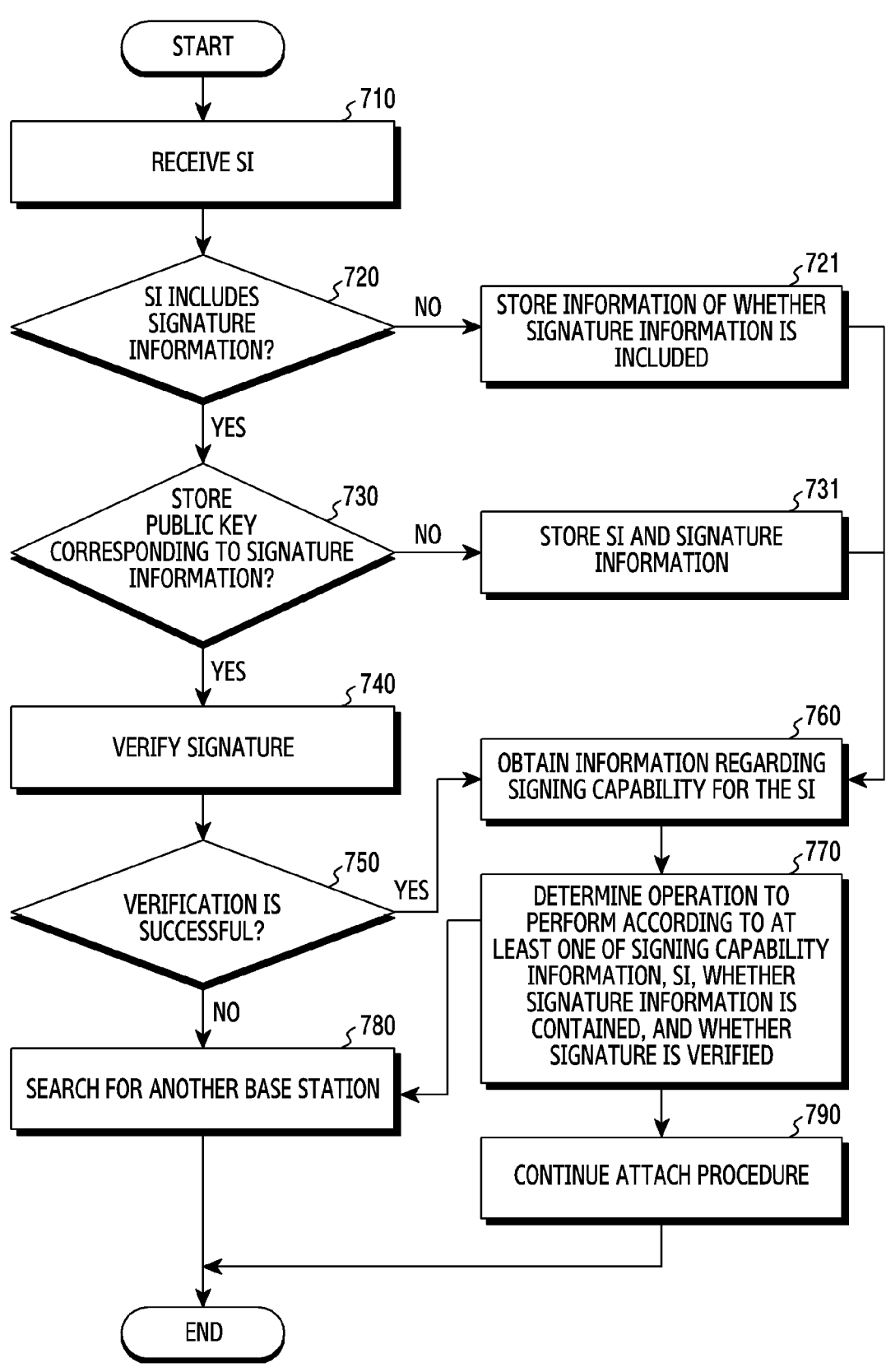
FIG. 7 illustrates a detailed flowchart of a method performed by a UE for authenticating a base station according to embodiments of the disclosure.

FIG. 7 illustrates a detailed flowchart of a method performed by a UE for authenticating a base station according to embodiments of the disclosure.

In operation 710, the UE may receive SI. This corresponds to operation 610 and shall be omitted in detailed description.

In operation 720, the UE may determine whether the SI includes signature information. If the signature information is not contained, the UE may store whether the signature information is included, the signature information and the SI in operation 721.

According to an embodiment, the UE may determine whether to verify the SI, depending on whether the signature information is included. If the signature information is included, the UE may determine whether a base station public key corresponding to the signature of the SI is stored in the UE in operation 730.

If the base station public key corresponding to the signature of the SI is not stored in the UE, the UE may store the SI and the signature information in operation 731. Since the signature is included but there is no public key for the verification, the UE may store the SI and the signature information, and determine whether to continue the attach procedure (initial attach procedure or connection procedure) based on whether the base station supports the signing capability and the stored SI and signature information.

According to an embodiment of the disclosure, the UE may request a base station public key from a network (e.g., the AM, the UDM, etc.) via the base station. To request the base station public key, the UE may transmit to a network entity a message including at least one of its public key list or a requested public key ID.

According to an embodiment of the disclosure, if the base station public key corresponding to the signature of the SI is stored in the UE, the UE may verify the SI in operation 740. If the base station public key corresponding to the signature of the SI is stored in the UE, the verification may be performed and thus the UE may verify the SI.

In operation 750, the UE may whether the verification is successful. If the verification fails, the UE may search for another base station in operation 780. If the verification fails, it is highly likely that the signature or the private key is tampered and accordingly and the UE may stop the attach procedure (initial attach procedure or connection procedure) and search for another base station (or cell) (or reselect a cell) in operation 780. If the verification is successful, the UE may continue the attach procedure (initial attach procedure or connection procedure) in operation 760.

In operation 760, the UE may obtain information regarding signing capability for the system information of the base station. This corresponds to operation 670 and shall be omitted in detailed description.

In operation 770, the UE may determine an operation to perform according to at least one of the information regarding signing capability for the system information of the base station, the SI, whether the signature information is included, and whether the signature is verified.

According to an embodiment, if not verifying the SI, the UE may authenticate the base station based on the information regarding signing capability for the system information of the base station. For example, if the SI does not include the signature and the base station supports the signing capability, the UE may identify that the base station of the current access procedure is fake. Since the base station supporting the signing capability is less likely to provide the SI containing no signature, the UE may determine the fake base station.

According to an embodiment, if the SI contains the signature and the base station supports the signing capability, the UE may identify that the base station of the current access procedure is fake. Notably, the UE may request a public key corresponding to the signature, additionally verify the SI, and then determine whether the base station is fake.

According to an embodiment, the UE may determine whether the base station currently performing the attach procedure is fake or genuine, according to correspondence between information about whether the signature information is included and information of whether the base station supports the signing capability.

According to an embodiment, if the verification is successful but the base station does not support the signing capability, the UE may identify that the base station of the current access procedure is fake. If the base station does not support the signing capability, it is highly likely that the SI contains no signature and accordingly the UE may determine that the successfully verified SI is SI of the fake base station.

Figure 8:
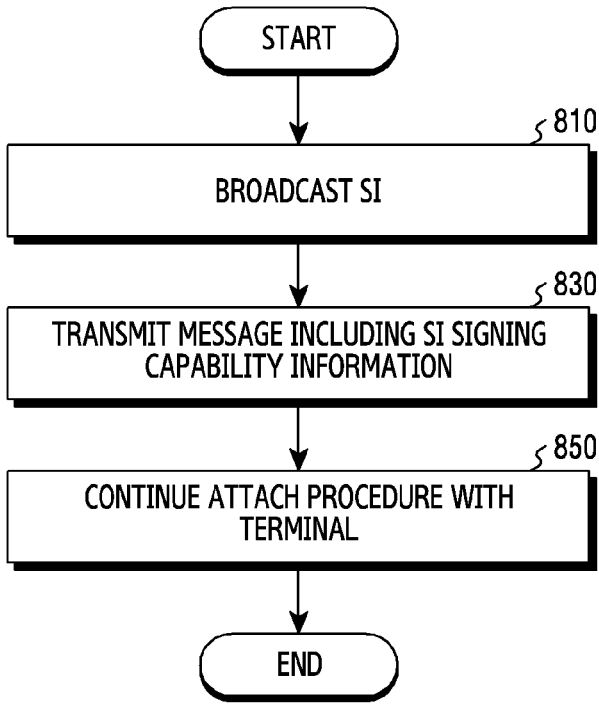
FIG. 8 illustrates a flowchart of a method performed by a base station for authenticating the base station according to an embodiment of the disclosure.

FIG. 8 illustrates a flowchart of a base station for authenticating the base station according to embodiments of the disclosure. The base station of FIG. 8 may indicate a genuine base station.

In operation 810, the base station may broadcast SI.

According to an embodiment, the base station may broadcast the SI including signature information according to its capability, and may include SI not including the signature information.

According to an embodiment, the SI may contain information related to a public key of the base station. For example, the public key information of the base station may be, but not limited to, a public key ID. The SI may contain, but not limited to, the cell ID, the PLMN ID, or so on.

In operation 830, the base station may transmit a message including the signing capability information of the SI.

According to an embodiment, the base station may provide the UE with the signing capability information through an AS message. Also, the base station may provide the UE with its signing capability information through an AS security mode command.

According to an embodiment, the base station may deliver a NAS message received from the AMF to the UE. The NAS message received from the AMF may include the signing capability information of the base station. The NAS message received from the AMF may include the NAS security mode command.

In operation 850, the base station may continue the attach procedure (initial attach procedure or connection procedure) with the UE.

According to an embodiment, the base station may continue the attach procedure based on an authentication result by the UE. The authentication result by the UE may be performed based on the SI, the signature information included or not included in the SI, and the signing capability information of the base station as mentioned above, and may further consider a verification result of the SI.

The disclosure relates to the technique in which the genuine base station transmits the SI by adding the signature and the UE verifies it, to prevent the attack of the fake base station.

Even though the mechanism in which the base station signs the SI, if the fake base station transmits the SI to the UE by removing the signature related value, the UE may camp on the fake base station unless every base station signs the SI. Hence, since the mechanism adopted for the best station to sign the SI and for the UE to verify it may not completely block the attack of the fake base station, an additional technique may be used. The disclosure provides a method for the UE to block an attack of the fake base station, by combining whether the SI broadcast by the base station contains the signature, whether the UE has the public key for the signature verification, and whether the integrity-protected (N)AS security mode command message includes the base station signing capability information.

According to an embodiment of the disclosure, a method performed by a terminal in a wireless communication system may include receiving system information from a base station, determining whether the system information includes signature information, in case that the signature information is not included, storing information of whether the signature information is included, obtaining information regarding signing capability for the system information of the base station, and determining whether to continue an attach procedure with the base station, based on at least one of the information of whether the signature information is included and the signing capability for the system information of the base station.

The system information may further include information regarding a public key of the base station, the method may include, in case that the system information includes the signature information, determining whether the information regarding the public key of the base station is stored in the terminal, in case that the public key corresponding to the information regarding the public key of the base station is stored, verifying a signature of the base station, and storing information of whether the signature is verified, wherein the determining of whether to continue an attach procedure with the base station comprises determining whether to continue the attach procedure with the base station by further considering the information of whether the signature is verified.

The method may include, in case that the public key corresponding to the information regarding the public key of the base station is not stored, storing the system information and the signature information.

Obtaining of the signing capability for the system information may comprise obtaining the signing capability for the system information from at least one of the base station and an access management function (AMF).

Obtaining of the signing capability for the system information may comprise obtaining the signing capability for the system information through at least one of a non-access stratum (NAS) message and an AS message.

Determining of whether to continue the attach procedure with the base station may further comprise in case that the system information does not includes the signature information and the base station supports the signing capability for the system information, searching for another base station.

Determining of whether to continue the attach procedure with the base station may further comprise in case that the system information and the signing information are stored and the base station does not support the signing capability for the system information, searching for another base station.

Determining of whether to continue the attach procedure with the base station may comprise in case that the signature is verified and the base station does not support the signing capability for the system information, searching for another base station.

According to an embodiment of the disclosure, a method performed by a base station in a wireless communication system may include broadcasting system information to a terminal, transmitting a message comprising information regarding signing capability for the system information to the terminal, and continuing an attach procedure with the terminal based on a base station authentication result by the terminal.

The system information may include at least one of signature information or information regarding a public key of the base station.

According to an embodiment of the disclosure, a terminal in a wireless communication system may include a transceiver and at least one processor coupled with the transceiver, and the at least one processor may be configured to receive system information from a base station, determine whether the system information includes signature information, in case that the signature information is not included, store information of whether the signature information is included, obtain information regarding signing capability for the system information of the base station, and determine whether to continue an attach procedure with the base station, based on at least one of the information of whether the signature information is included and the signing capability for the system information of the base station.

The system information may include information regarding a public key of the base station, and the at least one processor may be configured to, in case that the system information includes the signature information, determine whether the information regarding the public key of the base station is stored in the terminal, in case that the public key corresponding to the information regarding the public key of the base station is stored, verify a signature of the base station, and store information of whether the signature is verified, determine whether to continue the attach procedure with the base station by further considering the information of whether the signature is verified.

The at least one processor may be configured to, in case that the public key corresponding to the information regarding the public key of the base station is not stored, store the system information and the signature information.

The at least one processor may be configured to obtain the signing capability for the system information from at least one of the base station and an access management function (AMF).

The at least one processor may be configured to obtain the signing capability for the system information through at least one of a non-access stratum (NAS) message and an AS message.

The at least one processor may be configured to search for another base station in case that the system information does not includes the signature information and the base station supports the signing capability for the system information.

The at least one processor may be configured to searching for another base station in case that the system information and the signing information are stored and the base station does not support the signing capability for the system information.

The at least one processor may be configured to search for another base station in case that the signature is verified and the base station does not support the signing capability for the system information.

According to an embodiment of the disclosure, a base station in a wireless communication system may include a transceiver and at least one processor, and the at least one processor may be configured to broadcast system information to a terminal, transmit a message comprising information regarding signing capability for the system information to the terminal, and continuing an attach procedure with the terminal based on a base station authentication result by the terminal.

The system information may include at least one of signature information or information regarding a public key of the base station.

It should be noted that the diagrams illustrated in FIG. 1A through FIG. 8, the exemplary diagram of the control/data signal transmission method, and the operational procedure diagrams are not intended to limit the scope of the embodiments of the disclosure. That is, it should not be construed that all components, entities, or operations described in FIG. 1A through FIG. 8 are essential components for the implementation of the disclosure, and the disclosure may be carried out only with some elements without departing from the scope of the disclosure.

Operations of the aforementioned embodiments may be realized by providing a memory device storing corresponding program code in a configuration of the device. That is, a control unit of the device may execute the operations described above by reading and executing the program code stored in the memory device by means of a processor or a central processing unit (CPU).

Various components or modules in the entity or the UE described in the disclosure may operate by using a hardware circuit, for example, a complimentary metal oxide semiconductor-based logic circuit, firmware, software, and/or a hardware circuit such as a combination of hardware firmware and/or software embedded in a machine-readable medium. For example, various electrical structures and methods may be carried out by using electrical circuits such as transistors, logic gates, and ACISs.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

Meanwhile, while the specific embodiment has been described in the explanations of the disclosure, it will be noted that various changes may be made therein without departing from the scope of the disclosure. Therefore, the scope of the disclosure is not limited and defined by the described embodiment and is defined not only the scope of the claims as below but also their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    receiving system information from a base station, wherein the system information includes an indicator indicating a public key for a signature verification and signature information;
    verifying the signature information in the system information based on the indicator indicating the public key for the signature verification;
    storing information of whether the signature information is verified;
    receiving information regarding a capability for signing the system information for the base station; and
    determining whether to continue an attach procedure with the base station, based on the information of whether the signature information is verified, and the information regarding the capability for signing the system information for the base station.

2. The method of claim 1, wherein receiving of the information regarding the capability for signing the system information comprises receiving the information regarding the capability for signing the system information from at least one of the base station and an access management function (AMF).

3. The method of claim 1, wherein receiving of the information regarding the capability for signing the system information comprises receiving the information regarding the capability for signing the system information through at least one of a non-access stratum (NAS) message and an access stratum (AS) message.

4. The method of claim 1, wherein in case that the system information does not include the signature information and the base station supports the capability for signing the system information, the terminal search es for another base station.

5. The method of claim 1, wherein in case that the system information and the signing information are stored due to inability to perform verification of signature information and the base station does not support the capability for signing the system information, the terminal search es for another base station.

6. The method of claim 1, wherein in case that the signature information is verified and the base station does not support the capability for signing the system information, the terminal search es for another base station.

7. A terminal in a wireless communication system, comprising:

a transceiver; and at least one processor coupled with the transceiver, wherein the at least one processor is configured to:

receive system information from a base station, wherein the system information further includes an indicator indicating a public key for a signature verification and signature information, verify the signature information in the system information based on the indicator indicating the public key for the signature verification, store information of whether the signature information is verified, receive information regarding a capability for signing the system information for the base station, and determine whether to continue an attach procedure with the base station, based on the information of whether the signature information is verified, and the information regarding the capability for signing the system information for the base station.

8. The terminal of claim 7, wherein the at least one processor is further configured to receive the information regarding the capability for signing the system information from at least one of the base station and an access management function (AMF).

9. The terminal of claim 7, wherein the at least one processor is further configured to receive the information regarding the capability for signing the system information through at least one of a non-access stratum (NAS) message and an access stratum (AS) message.

10. The terminal of claim 7, wherein, in case that the system information does not include the signature information and the base station supports the capability for signing the system information, the terminal searches for another base station.

11. The terminal of claim 7, wherein in case that the system information and the signing information are stored due to inability to perform verification of signature information and the base station does not support the capability for signing the system information, the terminal searches for another base station.

12. The terminal of claim 7, wherein in case that the signature information is verified and the base station does not support the capability for signing the system information, the terminal searches for another base station.

* * * * *